Feb. 17. 1925. Re. 16,001

J. H. W. GILL

SCREW PROPELLER AND SIMILAR APPLIANCE

Original Filed June 15, 1920

Inventor
J. H. W. Gill
By
Watson, Cole, Moser & Grindle
Att.

Reissued Feb. 17, 1925. Re. 16,001

UNITED STATES PATENT OFFICE.

JAMES HERBERT WAINWRIGHT GILL, OF NORFOLK, ENGLAND, ASSIGNOR TO GILL PROPELLER COMPANY, LIMITED, OF KINGS LYNN, ENGLAND, A COMPANY OF GREAT BRITAIN.

SCREW PROPELLER AND SIMILAR APPLIANCE.

Original No. 1,454,967, dated May 15, 1923, Serial No. 389,195, filed June 15, 1920. Application for reissue filed September 30, 1924. Serial No. 740,813.

*To all whom it may concern:*

Be it known that I, JAMES HERBERT WAINWRIGHT GILL, a subject of the King of England, and residing at Norfolk, in England, have invented certain new and useful Improvements in Screw Propellers and Similar Appliances, of which the following is a specification.

This invention relates to screw propellers and similar appliances of the axial flow type such as are employed to impart energy to fluid streams or to develop propulsive reaction.

According to this invention the blades of the propeller are disposed within and carry on them a curved shroud whose inner surface has a contour which is substantially that of a nozzle designed so as to give to the fluid stream on which the propeller acts such rate of increase in velocity of flow as corresponds to a uniform progressive increase in the dynamical equivalent of head (herein referred to by the word "head") per unit axial distance through the shroud, i. e. so that there is a constant rate of increase in the square of the velocity of the fluid stream per unit axial distance through the shroud. When the propeller acts on a liquid the quantity of liquid passing any cross-section in a given time must be constant, and the velocity of flow is therefore inversely proportional to the cross-sectional area and therefore also to the square of the radius of the shroud. The condition above stated is thus equivalent to the condition that the fourth power of the radius of any section of the shroud is inversely proportional to the axial distance to that section. Expressed mathematically the internal contour of the shroud is a surface of revolution generated by the rotation of a part of the curve $y^4x$=constant.

The pitch of the blades increases in the direction of flow through the shroud, the pitch being inversely proportional to the diameter of the shroud, so that it conforms to the acceleration of the fluid stream passing through the shroud. The blades are carried on a suitably shaped hub which may conveniently be cylindrical though in some cases shaped otherwise and the shroud is formed integral with or is attached to the ends of the blades so that these are positioned within the shroud preferably otherwise than at the centre of the length of the latter and nearer to the larger end. The axial length of the shroud is such that it is less than the diameter of the propeller and greater than the axially projected width of the blades while the contour of the inner surface of the shroud is, as mentioned, substantially that of a nozzle of particular design. The object of the invention is to reduce interference with the natural contraction of the fluid stream under the increasing velocity impressed thereon and also to minimize discontinuity of flow and its contingent effects. These objects are attained by controlling velocities and pressures in the fluid stream during its forced acceleration.

The design of the nozzle-shaped shroud should be such as to assist in the formation of vortex action resembling that of a free spiral vortex and thus to minimize dissipation of energy in the fluid which is directly acted upon by the propeller. In the case of a fluid such as water the area of the stream which is acted upon by the propeller contracts under the increasing velocity and this natural contraction is assisted and controlled by the vortex shaped shrouding ring. True cavitation depends on the stream velocity at which the fluid acted upon will follow up the propeller blades, and while there is a limit to this velocity, incipient cavitation, which is largely due to radial flow and local eddies, and tends to occur at velocities of flow below the above mentioned limit, can be practically eliminated by means of a shrouding ring shaped as described.

The present invention has various advantages when compared with other known types of propeller more particularly when the invention is applied to ship propulsion. By promoting steady flow and preventing cavities from collapsing in contact with the blades and boss of the propeller the improved construction reduces the erosive effect consequent on cavitation. The employment of the nozzle shrouding ring strengthens the propeller and permits of higher speeds of revolution while minimizing vibration. Eddy losses and radial flow are reduced as also is the "out of pitch" effect which occurs with ordinary propellers when mounted on inclined shafts. Further the effect of "threshing" which occurs when a vessel pitches is lessened and the shrouding ring also obviates fouling of the propeller by ropes or nets. When employed for going astern a propeller provided with the improved shroud acts as an ordinary propeller but as if it was of less diameter and thus it affords an advantage as compared with a turbine propeller fitted with guide vanes.

The accompanying drawings illustrate by way of example one construction of propeller in accordance with this invention, the propeller being more particularly adapted for marine use.

In these drawings:—

Like letters indicate like parts throughout the drawings.

Figure 1:
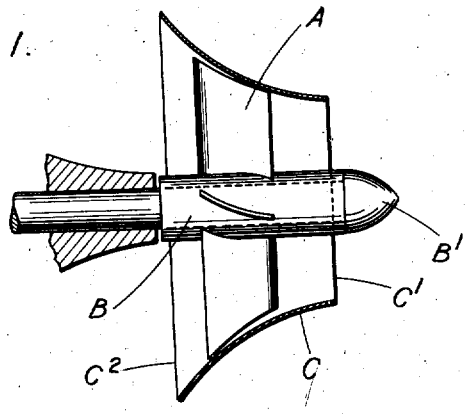
Figure 1 is a longitudinal sectional elevation of the improved propeller.
Figure 2:
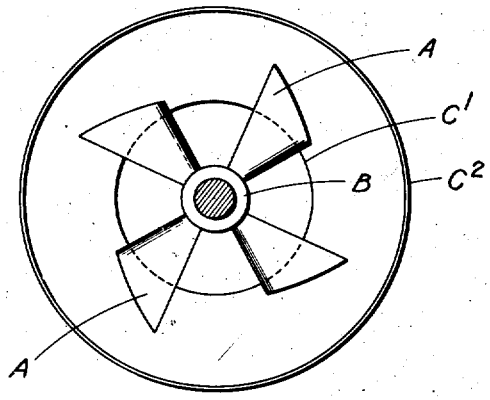
Figure 2 is an end view from the forward or inlet end.
Figure 3:
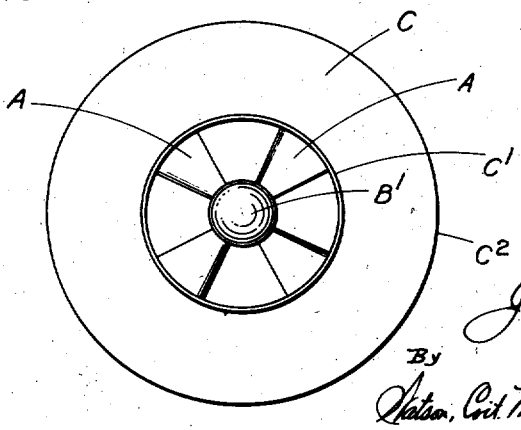
Figure 3 is a similar view from the after or delivery end.

In the construction shown the propeller has four blades A mounted on a cylindrical hub B whose after end is tapered off at B′ with a stream-line form. On the ends of the blades A is mounted a nozzle-shaped shroud C which is either formed integral with the blades or separate and attached thereto in some suitable manner. The blades A have a gaining pitch so as to conform with the acceleration of the water passing through the shroud C.

The length of the shroud C may vary in accordance with requirements and the conditions under which the propeller is to be used. In the construction shown the length of the nozzle measured in the axial direction is about three-quarters of the smaller diameter of the propeller. The smaller and outlet end C′ has a diameter which is about .8 of the small diameter of the propeller. It will be noted that the blades A are not positioned at the centre of the shroud C but to one side of this centre and somewhat towards the larger end $C^2$ of the shroud.

In some cases the hub B may be split and banded to allow for uniform contraction of the shroud C where the latter is made integral with the blades.

The leading edge $C^2$ at the inlet end of the shroud may be enlarged with an outside bulb while the after edge C′ is fined off from the inside, but if the propeller is likely to encounter ice or other obstructions through which it is desirable to cut the edge $C^2$ may be serrated.

The contour of the shroud is a surface of revolution generated by a suitable portion of the curve $y^4x$=constant, and thus approximates to that of a portion of a free spiral vortex, so that the shroud conforms approximately to the path which is naturally followed by the water acted on by the propeller blades. The pitch of the blades at any cross-section is inversely proportional to the internal diameter of the shroud at that section and thus conforms to the acceleration of the water passing through the shroud. When a propeller thus formed and shrouded is operating against a dead pull, as in towing, the radial effect and eddy losses are reduced and the propeller operates efficiently as an axial flow pump. The propeller will act efficiently when going astern but it then functions as an ordinary propeller of less diameter.

What I claim as my invention and desire to secure by Letters Patent is:—

1. In a screw propeller the combination of a hub, blades radiating from the hub, and a shroud mounted on the ends of the blades, the inner surface of the shroud having approximately the contour of a nozzle designed so as to give to the fluid stream on which the propeller acts such rate of increase in velocity of flow as corresponds to a uniform progressive increase in the dynamical equivalent of head per unit axial distance through the shroud, and the blades having axial increase of pitch in the direction of flow through the shroud to conform with the acceleration of the water passing through the shroud.

2. In a screw propeller the combination of a hub, blades radiating from the hub, and a shroud mounted on the ends of the blades, the inner surface of the shroud having approximately the contour of a nozzle designed so as to give to the fluid stream on which the propeller acts such rate of increase in velocity of flow as corresponds to a uniform progressive increase in the dynamical equivalent of head per unit axial distance through the shroud, the length of the shroud in the axial direction being less than the diameter of the propeller but greater than the axially projected width of the propeller blades, the blades having axial increase of pitch in the direction of flow through the shroud to conform with the acceleration of the water passing through the shroud.

3. In a screw propeller the combination of a hub, blades radiating from the hub, and a shroud mounted on the ends of the blades, the inner surface of the shroud having approximately the contour of a nozzle designed so as to give to the fluid stream on which the propeller acts such rate of increase in velocity of flow as corresponds to a uniform progressive increase in the dynamical equivalent of head per unit axial distance through the shroud, and the blades being positioned intermediate the ends of the shroud but otherwise than at the centre of its length, the blades having axial increase of pitch in the direction of flow through the shroud to conform with the acceleration of the water passing through the shroud.

4. In a screw propeller the combination of a hub, blades radiating from the hub, and a shroud mounted on the ends of the blades, said shroud having a length which measured in the axial direction is less than the diameter of the propeller but is greater than the axially projected width of the blades, the inner surface of the shroud being curved to an approximately conical form and being outwardly flared toward one end so as to give to the fluid stream on which the propeller acts such rate of increase in velocity of flow as corresponds to a uniform progressive increase in the dynamical equivalent of head per unit axial distance through the shroud, and the blades having axial increase of pitch in the direction of flow through the shroud to conform with the acceleration of the water passing through the shroud.

5. In a screw propeller the combination of a hub, blades radiating from the hub, and a shroud mounted on the ends of the blades, the shroud being curved to an approximately conical form and being outwardly flared toward one end, the blades being positioned within the shroud intermediate the ends of the latter but otherwise than at the centre of its length and said blades having axial increase of pitch in the direction of flow through the shroud to conform with the acceleration of the water passing through the shroud.

In testimony whereof I have signed my name to this specification.

JAMES HERBERT WAINWRIGHT GILL.